United States Patent [19]

Logsdon

[11] Patent Number: 4,768,560
[45] Date of Patent: Sep. 6, 1988

[54] PIPE PLUGS

[76] Inventor: Duane D. Logsdon, 1708 Calavera Dr., Fullerton, Calif. 92631

[21] Appl. No.: 47,126

[22] Filed: May 8, 1987

[51] Int. Cl.⁴ ............................................. F16L 55/10
[52] U.S. Cl. ...................................................... 138/90
[58] Field of Search ........................ 138/89, 90, 92, 93; 220/207, 236, 237, 254, 258, 266

[56] References Cited

U.S. PATENT DOCUMENTS

| | | | |
|---|---|---|---|
| 1,047,517 | 12/1912 | Harris | 220/207 |
| 2,604,225 | 7/1952 | Armstrong | 138/90 X |
| 3,412,759 | 11/1968 | Potter et al. | 138/89 |
| 4,393,900 | 7/1983 | Gajajiva et al. | 138/89 |
| 4,452,070 | 6/1984 | Kipp | 138/90 X |
| 4,460,019 | 7/1984 | Cordor | 138/90 |
| 4,506,705 | 3/1985 | Thompson | 138/89 |
| 4,620,330 | 11/1986 | Izzi, Sr. | 138/89 X |
| 4,678,097 | 7/1987 | Crute | 220/266 X |

FOREIGN PATENT DOCUMENTS 1565 of 1903 United Kingdom .................. 138/90
8704 of 1906 United Kingdom .................. 138/90

Primary Examiner—Mark J. Thronson
Attorney, Agent, or Firm—Edward D. O'Brian

[57] ABSTRACT

An expandable pipe plug can be constructed so as to use a peripherial elastomeric sleeve having an exterior surface which is adapted to seal against the interior of a pipe and a tapered internal surface which fits against a correspondingly shaped, tapered surface of a rigid expander. The tapered surfaces of the sleeve and the expander are provided with coaction threads so that as the expander is turned the sleeve will be expanded outwardly. The expander includes a stud for use with a tool such as a wrench in turning it relative to the sleeve, this stud including an internal threaded passage which is initially closed off by a knock-off disk. The passage can be used in connecting a pipe, a gauge, a valve of the like to the end of a pipe sealed off with the pipe plug.

5 Claims, 1 Drawing Sheet

U.S. Patent   Sep. 6, 1988   4,768,560
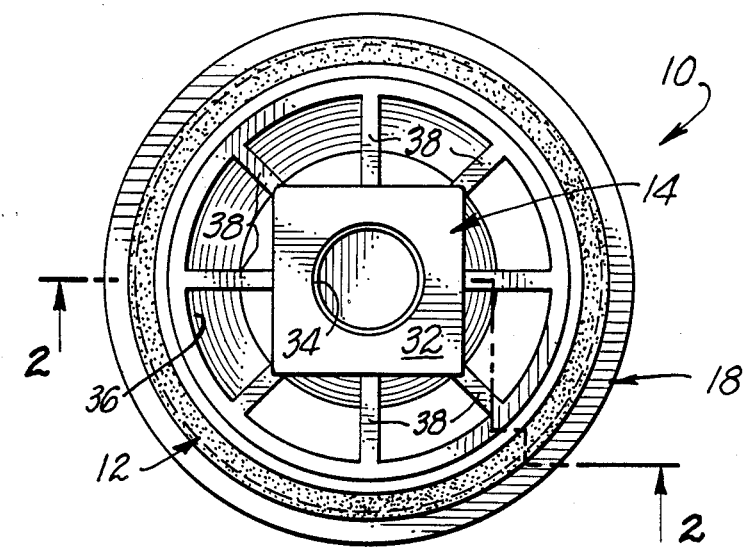
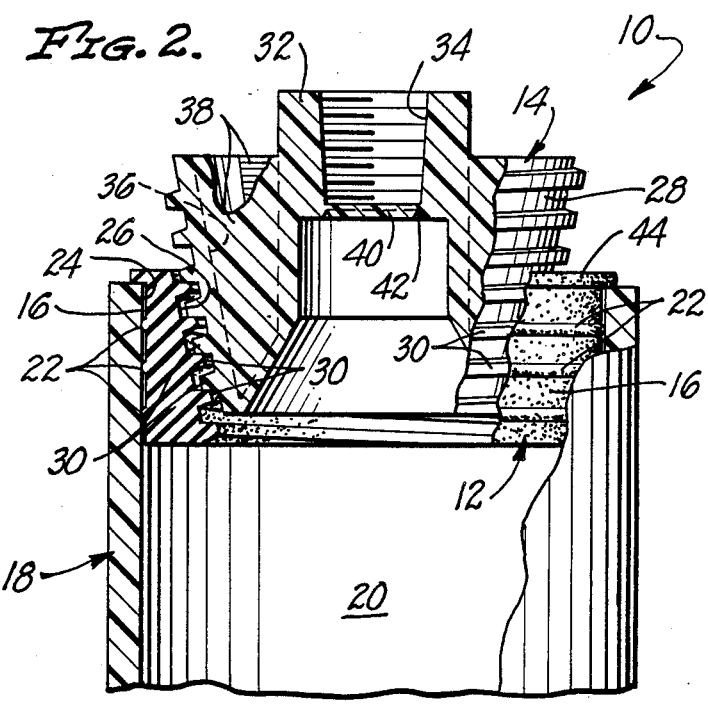

PIPE PLUGS

BACKGROUND OF THE INVENTION

The invention set forth in this specification pertains to new and improved pipe plugs.

Pipe plugs of the type to which this invention pertains can be used in closing off the ends of pipes so as to prevent the interiors of such pipes from becoming contaminated. They are more often used to close off the ends of pipes so that the interior a pipe or of a piping system can be tested for leakage under pressure. It is considered a matter of common knowledge in the plumbing field that a variety of internally fitting plugs and externally fitting end caps can be used for closing off the interior of an end of a pipe. Normally it is considered advisable to use internally fitting plugs to close off the ends of pipes of a comparatively large diameter.

As technology pertaining to the use of polymer pipes has advanced and as labor costs have increased, a particular type of internally fitting pipe plug has been increasingly used. Plugs of the latter type are constructed so as to each include an elastomeric, expandable sleeve which can be easily inserted within a pipe and then expanded so as to form a seal with the interior of the pipe and what may be referred to as a one piece, plug-like, rigid expander which fits with the sleeve in such a manner that it can be turned or rotated relative to the sleeve so as to expand the sleeve. Pipe plugs of this category are significantly less complex and less expensive than other types of plugs formed so as to apply pressure generally towards the opposite ends of the sleeve to expand the sleeve.

In plugs using only an expandable sleeve and a one piece expander, it has been customary to form the sleeve so that its exterior is cylindrical and so that it has a tapered, internally threaded surface and to form the expander so that it has a correspondingly tapered and threaded surface and a centrally located means such as a square stud for engaging the expander with a wrench so as to turn it relative to the sleeve in order to expand the sleeve within the interior of the end of a pipe. Pipe plugs constructed in the manner have proved to be highly utilitarian. However, it is considered that in general they are not as desirable as might be desired.

Most commonly, the exteriors of the sleeves with this type of pipe plugs are substantially smooth cylindrical surfaces which are formed so as to only be slightly less in initial or unstressed external diameter than the internal diameter of a pipe of a size with which the sleeve is designed to be used. In theory such a close match in diameters is desirable since it enables a sleeve alone or an entire plug including the sleeve to be easily inserted in a pipe end and since only a limited amount of expansion is then necessary to bring the sleeve into sealing engagement with the interior of a pipe. Unfortunately it is believed that in some circumstances surface irregularities either at the periphery of the sleeve or in that interior of the pipe or as a result of a contaminate particle being present will tend to interfere with sealing action achieved.

Obviously the latter is undesirable. It is also considered that the prior pipe plugs of the type indicated are not as desirable as reasonably possible since normally they have been constructed so that they can only serve one function—that of sealing the end of a pipe. While there is nothing wrong with this, at times the fact that a pipe plug can only be used for sealing purposes is undesirable. This is particularly the case when there is no reasonably convenient, apparent manner of pressurizing the interior of a pipe so as to test against leakage or of mounting a gauge so as determine the internal pressure within a pipe or piping "system".

BRIEF SUMMARY OF THE INVENTION

It is believed that it will be apparent from the preceding discussion that there is an apparent need for new and improved internally fitting pipe plugs. The invention is intended to provide new and improved pipe plugs fulfilling this need. More specifically, it is intended to provided pipe plugs which can be manufactured at substantially the same cost as prior related pipe plugs and which can be installed in substantially the same manner as prior related pipe plugs but which are more desirable than prior related plugs because of either the effectiveness of the internal seals which can be achieved with them and/or because of the manner they can be used for other than merely sealing the end of a pipe.

In accordance with this invention these various objectives are achieved by providing an expandable diameter pipe plug having an external elastomeric sleeve shaped so as to include an external surface capable of being expanded into the interior of a pipe so as to form a seal therewith and an internal threaded, tapered surface and having a rigid expander shaped so as to include an external threaded, tapered surface fitting against said tapered surface of said sleeve with the threads on said surfaces in engagement with one another and having means for use in turning said expander relative to said sleeve in order to expand a sleeve in which the improvement comprises either: (1) the means for use in turning the expander comprising a stud having a centrally located passage which is normally closed off but which can be open when said pipe plug is used to seal of the interior of the end of a pipe; (2) the exterior of said sleeve including a plurality of continuous peripheral sealing flanges extending therefrom, said flanges having an external diameter corresponding to at least the internal diameter of a pipe with which said pipe plug is intended to be used prior to said sleeve being expanded and serving to space said external surface from the interior of a pipe within which said pipe plug is installed prior to the expansion of said pipe; or, preferably, both (1) and (2).

BRIEF DESCRIPTION OF THE DRAWING

Because of the nature of the invention it is considered that it is best more fully described with reference to the accompanying drawing in which:

FIG. 1 is a top plan view of a presently preferred embodiment or form of a pipe plug in accordance with this invention located within the end of a pipe prior to being expanded into a normally desired sealing engagement with the interior of the pipe; and FIG. 2 is a side elevational view of the installed pipe plug illustrated in FIG. 1 which is broken away so that in part this view corresponds to a cross-sectional view taken at line 2—2 of FIG. 1.

The pipe plug illustrated in the drawing is constructed so as to utilize the operative concepts or principals of this invention as are set forth and defined in the appended claims. Those skilled in the field of the design and manufacture of pipe closures will realize that these concepts and principles can be embodied within other somewhat differently appearing and/or differently constructed pipe plugs through the exercise of routine skill in the noted field. For this reason the accompanying invention is not to be considered as being limited to the precise pipe plug illustrated and described in this specification and is to be considered as being limited only by the claims.

DETAILED DESCRIPTION OF THE PREFERRED EMBODIMENT

In the drawing there is a shown a pipe plug 10 in accordance with the present invention which has two parts: (1) a resilient, elastomeric sleeve 12 and (2) and a rigid expander 14. Both the sleeve 12 and the expander 14 are preferably formed in the same manner as the corresponding parts of prior closely related pipe plugs as indicated in the preceding discussion out of polymer compositions such as have been used in the manufacture of such parts. For this reason it is not considered necessary to discuss either the manufacture of such parts or such materials in detail in this specification.

The sleeve 12 is preferably formed so as to include an external cylindrical surface 16 which is of less diameter than the internal diameter of a pipe 18 with which the plug 10 is intended to be used but which is of sufficient diameter so as to normally contact the interior 20 of the pipe 18 as the plug 10 is employed as hereinafter described. A series of identically spaced, parallel sealing flanges 22 are provided along the length of the surface 16 as shown. Each of these flanges 22 is a continuous flange or ring. Preferably these flanges 22 are of a diameter at least equal to the internal diameter of the pipe 18 so as to frictionally engage the interior 20 of the pipe 18 so as to hold the plug 10 in place in the pipe 18 as the plug 10 is being installed which is sufficiently small enough so that the plug 10 can be easily slipped into place within an end 24 of the pipe 18 as shown.

The intent here is to provide flanges 22 which will not impede the assembly of the plug 10 in a pipe 18 as shown and which preferably will serve to exercise a temporary frictional holding action during the installation of the pipe plug 10. In some cases it will not be necessary to more securely mount the plug 10 within a pipe end 24 as, for example, when it is only desired to use the plug 10 as a temporary closure to keep out ambient contaminants. Normally, however, it is desired to use the plug 10 so that there is an effective seal formed between the sleeve 12 and the interior 20 which will hold the plug against movement in the direction of the length of the pipe 18.

In order to form such a seal it is considered desirable to shape the flanges 22 so that each cross-section has a half round configuration as shown prior to being compressed. When these flanges 22 are of this shape there is little danger of them being damaged during handling and installation. During the formation of such a seal the sleeve 12 is expanded as a result of pressure being applied to an internally tapered surface 26 of it by the expander 14. This expander 14 includes an exterior tapered surface 28 the slope of which is the same as the slope of the surface 26. Matching threads 30 are formed on both the surface 26 and the surface 28 so that as the expander 14 is turned the surface 28 will move along the surface 26 so as to expand the sleeve 12.

Preferably such expansion will be adequate to set up a distortion pattern in the surface 12 such that this surface 12 will contact the interior 20 of the pipe 18 along side of the flanges 22. When, as preferred, the heights of the flanges 22 from the surface 16 are at least as large as the largest dimensions of any reasonably anticipated contaminant particles or surface irregularities, this distortion pattern will normally be adequate to accommodate any such encountered contaminants or surface regularities so that such items will not interfere with either the holding action or the seal achieved.

In order to guard against the possibility of internal slippage between the expander 14 and the sleeve 12, it is considered desirable to form the threads 30 of a more or less squarish cross-sectional configuration. Threads such as "Acme" threads as are used in transmitting comparatively heavy forces or loads in many mechanical structures can be used satisfactorily.

The expander 14 differs from prior related expanders by including an axially aligned stud 32 which is not only shaped so that it is adapted to be engaged by a wrench or similar tool (not shown) so as to expand the sleeve 12, but which, in addition, is shaped to have an internally axially aligned, internally treaded threaded passage 34 which is normally accessible when the plug 10 is used as shown. Depending upon the size of the plug 10 it may be and normally is desirable to secure the stud 32 to an imperforate wall 36 upon which the surface 28 is located by the use of conventional webs 38.

The plug 10 is normally supplied to a user with the passage 34 closed off by an internal knock-out disk 40 of conventional design. The disk 40 is attached to the remainder of the expander 14 through the use of a small frangibliee ring 42 which can be easily severed by a blow applied through the use of a tool extending through the passage 34. It is noted that this disk 40 is located more or less about the region where the stud 32 is joined to the wall 36 so that there is no possibility of any remainder of the ring 42 remaining after the removal of the ring 42 interfering with a pipe, a gauge, a valve or the like (not shown) being threaded into the passage 34 after the plug 10 has been installed in the pipe 18.

Such installation is comparatively easy. The assembled plug 10 prior to any expansion of the sleeve 12 is inserted as shown in the end 24 of the pipe 18. Usually a terminal flange 44 adapted to fit against the end 24 will be used on the sleeve 12 so as serve as a visual guide as to its "correct" or desired insertion. At this point the stud 32 will be engaged so as to turn the expander 14 to a degree sufficient to form a seal between the sleeve 12 and the pipe 18. Normally it will be adequate to turn the expander 14 only to a sufficient extent that it cannot be moved without the aid of tools from the pipe 18.

In some cases the internal diameter of a particular pipe 18 will be slightly more or less than the intended diameter of a pipe 18 with which the plug 10 is intended to be used. In order to accommodate the plug 10 so that it can be used in either of these circumstances it is preferred to form the expander 14 so that the surface 28 is longer than the surface 12 and so that it will vary in diameter from having a smallest diameter less than the minimum diameter of the surface 26 to a largest diameter which is larger than the largest diameter of the surface 26 when the sleeve 12 is not expanded. It is considered that usually it is acceptable to dimension the expander 14 so that its smallest diameter is at least about at least 5% smaller than the smallest diameter of the surface 26 and so that its largest diameter is at least about at least 5% larger than the largest diameter of the surface 26.

I claim:

1. An expandable diameter pipe plug having an external elastomeric sleeve shaped so as to include an external surface capable of being expanded into the interior of a pipe so as to form a seal therewith and an internally threaded, tapered surface and having a rigid expander having a first end which is normally external of said pipe when said plug is used and a second end which is normally internal of said pipe when said plug is used, said expander being shaped so as to include an externally threaded, tapered surface fitting against said tapered surface of said sleeve with the threads on said surfaces in engagement with one another and having means for use in turning said expander relative to said sleeve in order to expand said sleeve located so as to be accessible from said first end of said expander;

said means for use in turning the expander comprising an axially aligned stud shaped so as to be adapted to be engaged by a wrench so as to rotate said expander and having a centrally located, axially aligned, internally threaded passage which extends from said first end into said expander so that a pipe can be threaded into said passage at said expander, said expander including an internal knockout plug closing off the interior of said passage at the second end of said expander.

the exterior of said sleeve includes a plurality of continuous peripheral sealing flanges extending therefrom, said flanges having an external diameter corresponding to at least the internal diameter of a pipe with which said pipe plug is intended to be used prior to said sleeve being expanded and serving to space said external surface from the interior of a pipe within which said pipe plug is installed prior to the expansion of said pipe.

2. A pipe plug as claimed in claim 1 wherein:
the length of said tapered surface of said expander is such that the minimum diameter of said tapered surface on said expander is at least about 5% smaller than the minimum diameter of said tapered surface on said sleeve and the maximum diameter of said tapered surface on said expander is at least about 5% greater than the maximum diameter of said tapered surface on said sleeve.

3. A pipe plug as claimed in claim 1 wherein:
said flanges have a half round cross-sectional configuration and extend from said tapered surface of said sleeve a distance which is greater than the maximum dimension of any contaminants or surface irregularities which will normally be encountered during the use of said pipe plug.

4. A pipe plug as claimed in claim 3 wherein:
said flanges are located sufficiently far apart so as to permit said tapered surface to be expanded into sealing contact with the interior of a pipe with which said plug is used during the use of said plug.

5. A pipe plug as claimed in claim 1 wherein:
the length of said tapered surface of said expander is such that the minimum diameter of said tapered surface on said expander is at least about 5% smaller than the minimum diameter of said tapered surface on said sleeve and the maximum diameter of said tapered surface on said expander is at least about 5% greater than the maximum diameter of said tapered surface on said sleeve, said flanges have a half round cross-sectional configuration and extend from said tapered surface of said sleeve a distance which is greater than the maximum dimension of any contaminants or surface irregularities which will normally be encountered during the use of said plug, said flanges are located sufficiently far apart so as to permit said tapered surface to be expanded into sealing contact with the interior of a pipe with which said plug is used during the use of said plug.

* * * * *